United States Patent [19]

O'Neill et al.

[11] 3,865,950
[45] Feb. 11, 1975

[54] METHYLCYCLOPROPANE ANESTHETICS

[75] Inventors: Gerald Joseph O'Neill, Arlington; Charles William Simons, Bedford; Charles Alden Billings, Concord, all of Mass.

[73] Assignee: W. R. Grace & Co., Cambridge, Mass.

[22] Filed: Oct. 23, 1973

[21] Appl. No.: 408,709

[52] U.S. Cl. ............................................. 424/352
[51] Int. Cl. ............................................ A61k 27/00
[58] Field of Search ................................ 424/352

[56] References Cited
UNITED STATES PATENTS
3,769,429   10/1973   O'Neill et al. .................. 424/352

Primary Examiner—Jerome D. Goldberg
Attorney, Agent, or Firm—Armand McMillan; C. E. Parker

[57] ABSTRACT

The following halogenated methylcyclopropanes have been found useful as general inhalation anesthetics: 1-chloro-1,2-difluoro-2-methylcyclopropane, 1-chloro-1-fluoro-2,2-dimethylcyclopropane, 1-chloro-1-fluoro-2-methylcyclopropane and 1-chloro-1-fluoro-2,3-dimethylcyclopropane.

5 Claims, No Drawings

METHYLCYCLOPROPANE ANESTHETICS

THE PRIOR ART

In the continuing search for new and better general inhalation anesthetics, there has been recently discovered a number of useful fluorinated cyclobutanes containing one or more types of non-fluorine substituents including hydrogen, chlorine and bromine as well as the methyl and trifluoromethyl groups. In the field of cyclopropanes, however, recent developments have been restricted to a few halofluoro compounds, as disclosed in copending application Ser. No. 395,303 filed on Sept. 7, 1973 and two halogenated methyl compounds disclosed in copending applications Ser. No. 259,253 filed on June 2, 1972 now U.S. Pat. No. 3,769,429. Prior to these current developments which have been contributed by the applicants, the only known cyclopropane compounds with a claim to anesthetic properties were cyclopropane itself, and the 1-methyl-1-trifluoromethyl cyclopropane reported by Krantz and Rudo [Handbuch of Experimental Pharmakologie 20 (1), at page 525 (1966)]. On assessing the progress reported in the art, as just reviewed, one must agree with these authors who, after an extensive compilation of the results of a few hundred tests on fluorinated compounds, conclude that cyclic halogenated compounds tend to be toxic. In fact, it has been applicants' experience generally that for each useful compound discovered, there has been found one or more other structurally closely related compounds which are either useless or deleterious. Thus, despite the disclosures in recent years, it can be reasonably said that little has been added to the understanding of the mode of action of chemical compounds in this physiological role and, because of this, the relationship of the similarities and differences between fairly similar compounds with either their toxic or therapeutic properties remain substantially unidentified. The discovery of additional substances possessing a desirable combination of properties for anesthetic purposes still lies, therefore, beyond the scope of routine expertise.

SUMMARY OF THE INVENTION

It has now been discovered that newly synthesized 1-chloro-1,2-difluoro-2-methylcyclopropane and 1-chloro-1-fluoro-2,3-dimethylcyclopropane and known compounds 1-chloro-1-fluoro-2-methylcyclopropane and 1-chloro-1-fluoro-2,2-dimethylcyclopropane possess high potency as general anesthetics when administered to inhalation-anesthetic-susceptible organisms.

DETAILED DESCRIPTION

The compounds which constitute the basis of this invention may be prepared by any of several methods depending on the availability of starting materials and on the yield considered acceptable under the circumstances. These methods ultimately involve a catalyzed cyclization reaction between a suitable halocarbene (:CYZ) and an appropriate olefinic compound:

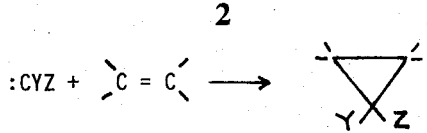

The halocarbene may be generated by the decomposition of a number of precursors, including phenyl(trihalomethyl) mercury compounds, according to the method of D. Seyferth et al [J. Am. Chem. Soc. 87, 4259–70 (1965)] or a properly halogenated fluoropropylene oxide [J. Org. Chem. 31, 2312 (1966)]. The actual method employed in the present instance, as described in the following examples, is an adaptation of a known procedure for the general synthesis of gem-dihalo-cyclopropanes [Synthesis 2, 112 (1973)].

EXAMPLES 1 to 4

The methylcyclopropanes of the invention are prepared by the cyclization of the carbene :CFCl with an appropriate olefin. The carbene was prepared in concentrated sodium hydroxide solution from dichlorofluoromethane with the assistance of an ionic salt such as triethylbenzylammonium bromide. The reactions involved are:

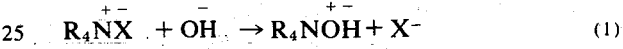  (1)

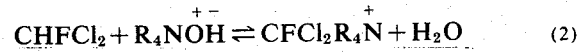  (2)

  (3)

The quaternary ammonium hydroxide formed (1), being insoluble in the reaction mixture, migrates to the boundary between the aqueous and the organic phases where it reacts with the trihalomethane to yield the quaternary ammonium derivative of the trihalomethyl anion (2). After diffusion into the organic phase, the derivative is transformed (3) into the carbene :CFCl and the catalyst halide. The carbene then reacts with the olefin to yield a cyclopropane compound. The olefins used in these examples and the products obtained are listed in Table 1.

In a typical preparation, for instance that of Example 4, 50percent aqueous sodium hydroxide, 125 ml, is placed into a 300 ml stainless steel autoclave with triethylbenzylammonium bromide, 1.0 g, dichlorofluoromethane, 0.75 mole, and isobutylene, 0.5 mole. The contents of the autoclave are stirred at ambient temperature until all the halogenated methane has been consumed, in this case a period of about 24 hours. The reaction mixture is then vacuum distilled to collect the organic phase and the distillate is further refined by redistillation after separation of entrained water. Clear colorless liquid 1-chloro-1-fluoro-2,2-dimethylcyclopropane is obtained, as identified by specific gravity and boiling point (Table 2), in yield of 39 percent, based on the methane, and 98 percent, based on the olefin.

The olefinic starting material and the product obtained in this and other examples are listed in the following table.

TABLE 1

PREPARATION OF 1-CHLORO-1-FLUOROCYCLOPROPANES

| Ex. | Olefin | Product | Yield* | Mol. Wt. | Spec. Gravity ($n_4^{20}$) | Boiling Point (°C) |
|---|---|---|---|---|---|---|
| 1 | 2-fluoropropene | 1-Cl-1,2-diF-2-methyl cyclopropane | 37% | 126.5 | 1.188 | 71° |

TABLE 1 — Continued

PREPARATION OF 1-CHLORO-1-FLUOROCYCLOPROPANES

| Ex. | Olefin | Product | Yield* | Mol. Wt. | Spec. Gravity ($n_4^{20}$) | Boiling Point (°C) |
|---|---|---|---|---|---|---|
| 2 | 2-butene | 1-Cl-1-F-2,3-dimethylcyclopropane | 26% | 122.6 | 1.018 | 86–87° |
| 3 | propylene | 1-Cl-1-F-2-methylcyclopropane | 21% | 108.6 | 1.053 | 61.5° |
| 4 | isobutylene | 1-Cl-1-F-2,2-dimethylcyclopropane | 39% | 122.6 | 1.018 | 80–80.5° |

*These yields are calculated on dichlorofluoromethane basis.

EXAMPLES 5 TO 8

The physiological effects of the cyclopropanes prepared in the preceding examples were demonstrated as follows, using a standard test for evaluation of inhalation anesthetics similar to that described in Robbins [J. Pharmacology and Experimental Therapeutics 86, 197 (1946)].

Mice were exposed to the anesthetic for a period of 10 minutes in a rotating drum. Observations were then made of the pinch reflex, the corneal reflex and the return of the righting reflex. At least four graded doses were employed to determine the minimum concentration required to anesthetize 50 percent of the mice used ($AC_{50}$) and the minimum concentration required to kill 50 percent of the mice ($LC_{50}$). The anesthetic index (AI) was then calculated from these minimum concentrations. The results of these tests are summarized in the following table.

TABLE 2

ANESTHETIC PROPERTIES OF 1-CHLORO-1-FLUOROCYCLOPROPANES

| Ex. | Cyclopropane | $AC_{50}$ (% volume) | $LC_{50}$ | AI ($LC_{50}/AC_{50}$) |
|---|---|---|---|---|
| 5 | 1-Cl-1,2-diF-2-methyl- | 2.5% | >6% | >2.4 |
| 6 | 1-Cl-1-F-2,3-dimethyl- | 1% | 1.5–2.5%* | 1.5–2.5 |
| 7 | 1-Cl-1-F-2-methyl- | 2–3% | 6–7% | 2–3.5 |
| 8 | 1-Cl-1-F-2,2-dimethyl- | 1.5% | 3–4% | 2–2.7 |

*When two figures are given, the actual parameter lies between them.

As these results indicate, four effective anesthetic agents have been added to the art. It should be understood that variations can be carried in either the preparation or the administration of these compounds depending on factors such as economic considerations, level and duration of anesthesia desired, subject treated, and the like. Such variations evidently fall within the scope and the spirit of the invention as claimed.

What we claim is:

1. The process of inducing anesthesia in a mammal which comprises administering by inhalation to said mammal an effective quantity for inducing a state of anesthesia, of a compound selected from the group consisting of 1-chloro-1,2-difluoro-2-methylcyclopropane, 1-chloro-1-fluoro-2,3-dimethylcyclopropane, 1-chloro-1-fluoro-2-methylcyclopropane and 1-chloro-1-fluoro-2,2-dimethylcyclopropane.

2. The process of claim 1 wherein the compound administered is 1-chloro-1,2-difluoro-2-methylcyclopropane.

3. The process of claim 1 wherein the compound administered is 1-chloro-1-fluoro-2,3-dimethylcyclopropane.

4. The process of claim 1 wherein the compound administered is 1-chloro-1-fluoro-2-methylcyclopropane.

5. The process of claim 1 wherein the compound administered is 1-chloro-1-fluoro-2,2-dimethylcyclopropane.

* * * * *